United States Patent [19]

Inohara et al.

[11] 4,408,143

[45] Oct. 4, 1983

[54] COLOR IMAGE DISPLAY APPARATUS

[75] Inventors: Shizuo Inohara, Toyonaka; Mitsuya Masuda, Kyoto; Sadahiro Iyehara, Suita; Minoru Ueda, Takatsuki; Keisuke Yamamoto, Ibaraki, all of Japan

[73] Assignee: Matsushita Electric Industrial Co., Ltd., Osaka, Japan

[21] Appl. No.: 387,144

[22] Filed: Jun. 10, 1982

[30] Foreign Application Priority Data

Jun. 18, 1981 [JP] Japan .................................. 56-94994

[51] Int. Cl.³ ........................ H01J 29/70; H01J 29/72
[52] U.S. Cl. .................................... 315/366; 313/422
[58] Field of Search ................. 315/366, 383; 313/422

[56] References Cited

U.S. PATENT DOCUMENTS 3,720,859  3/1973  Hilden ................................. 315/383
4,227,117  10/1980  Watanabe et al. ................... 315/366
4,234,825  11/1980  Gange ................................. 315/383

*Primary Examiner*—Theodore M. Blum
*Attorney, Agent, or Firm*—Cushman, Darby & Cushman

[57] ABSTRACT

The video image display apparatus of flat tube type comprising a phosphor screen, an electron beam source having a predetermined number (15) of line cathodes for inturn emitting said predetermined number of horizontal rows of electron beams, each row having a second predetermined number (320) of rod shaped electron beams for together producing one horizontal line of image on said phosphor screen, a horizontal deflection means for horizontally deflection of the electron beams to selectively emit red, green or blue phosphor stripes, a vertical deflection means for vertical deflections of the electron beams of the horizontal rows, thereby to vertically move one of the horizontal line in the vertically divided segment, wherein red, green and blue color signals are time sequentially sampled by sets of three sampling signals of time sequential relation, and the sampled color signals are impressed on the horizontal deflection means, and thereby, hitherto poor horizontal resolution is much improved as if the sampling frequency is raised 3 times high.

3 Claims, 7 Drawing Figures

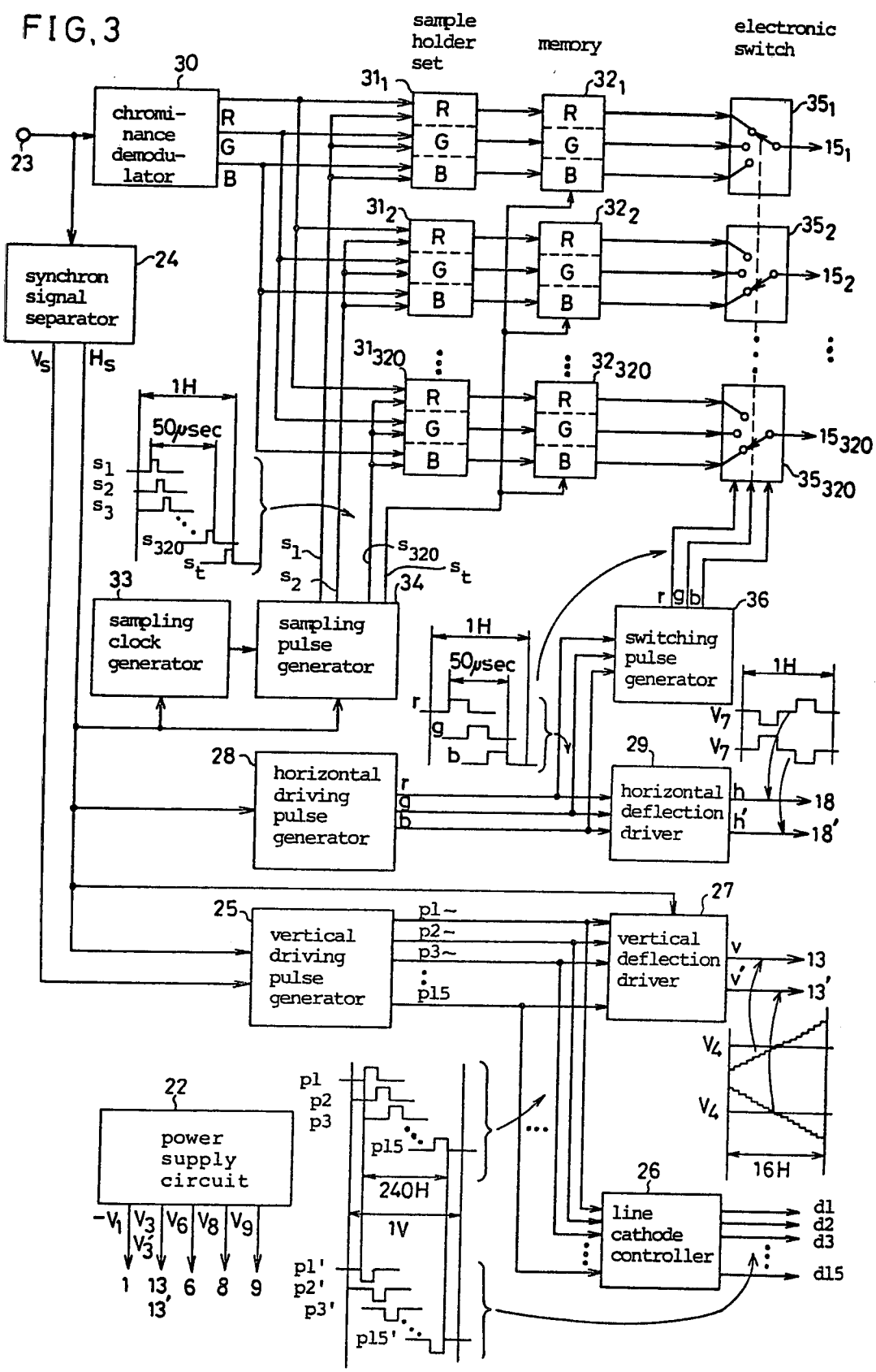

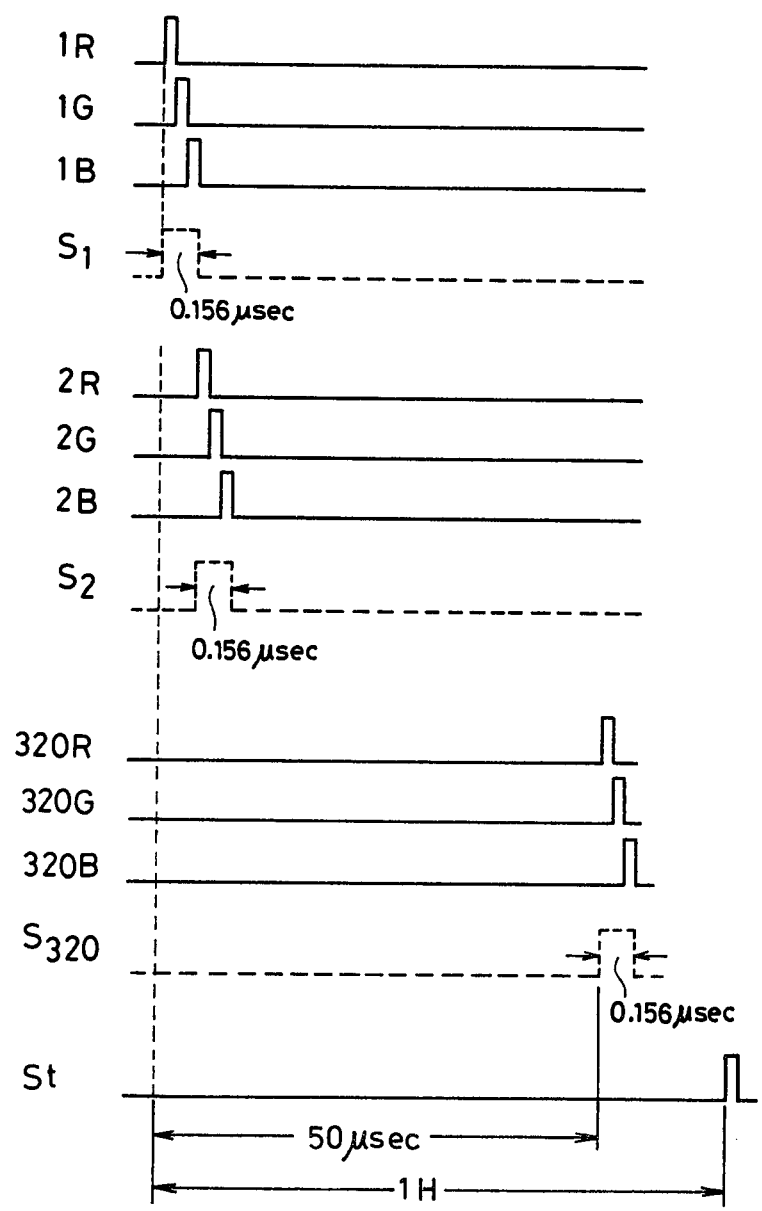

FIG. 6
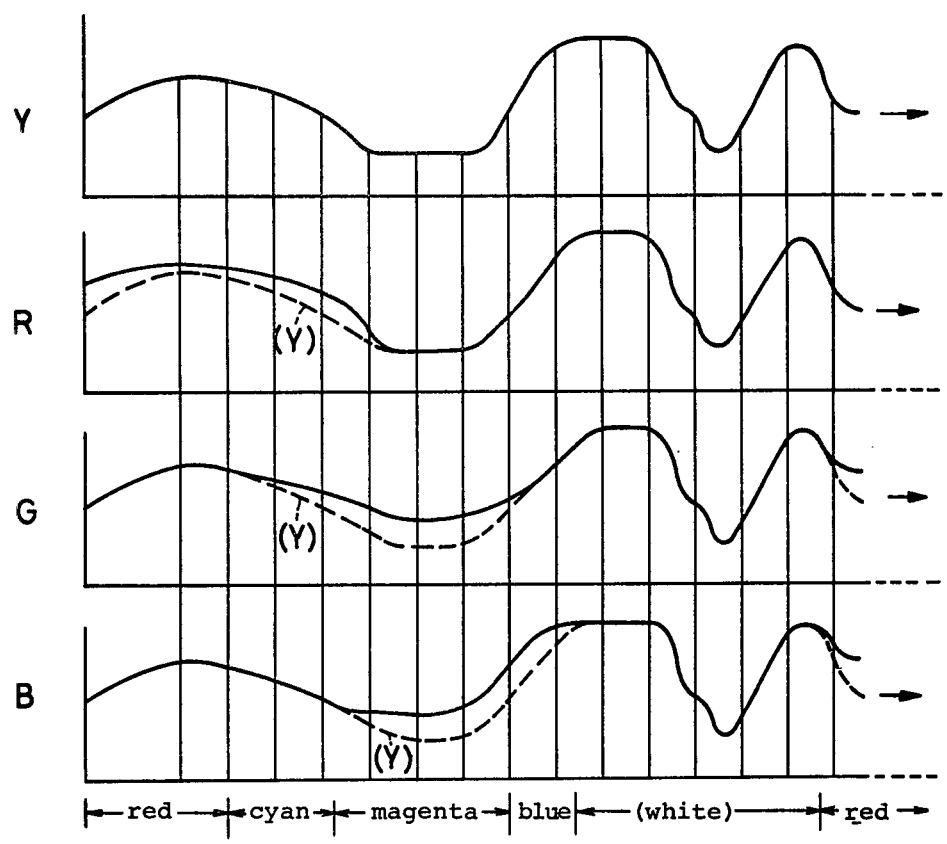
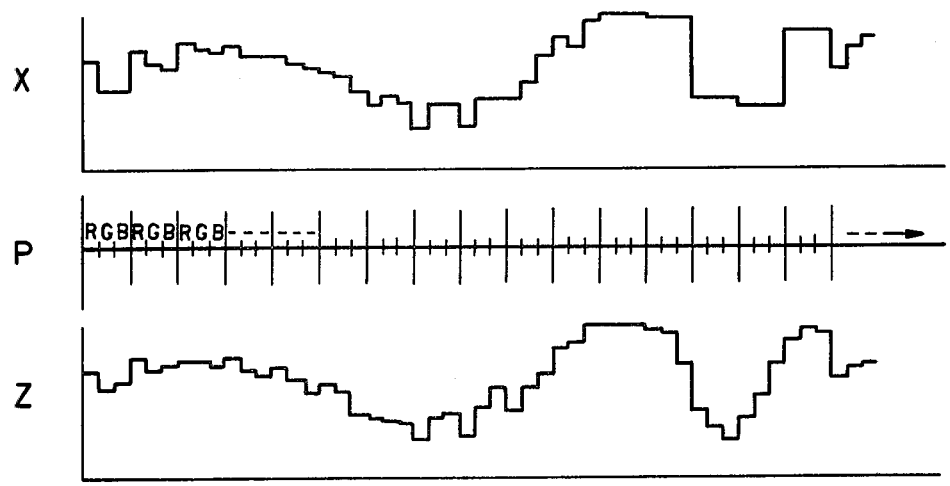

COLOR IMAGE DISPLAY APPARATUS

BACKGROUND OF THE INVENTION

1. Field of the Invention

The present invention relates to an image display apparatus comprising a flat chathode-ray tube with a number of line cathodes.

More particularly, the present invention concerns an image display apparatus wherein its display screen is divided into a plural number of segments in the vertical direction, and to every those segments one respective electron beam is provided, and in those segments a plural number of horizontal lines are displayed by means of deflecting those respective electron beams in the vertical direction, and each segment has red, green and blue phosphor regions or subsegments disposed in horizontal direction along which horizontally divided electron beams scan in horizontal direction to display color dots to constitutes the horizontal lines thereby, as a whole, a television picture image is displayed.

2. Description of the Prior Art

Hitherto, for an image display apparatus for a television set, a cathode-ray tube having three electron guns or a single electron gun set in a neck part of a bulky cone shaped vacuum enclosure has been used for long time. The shortcoming of the conventional cathode ray tube is a large depth in comparison with the size of the screen face, disabling to provide a flat and compact television set. Though EL display apparatus, plasma display apparatus or liquid crystal display apparatus has been developed, they are not sufficiently usable for practical use because they have problems in their brightness and contrast.

Therefore, intending to obtain an apparatus wherein color television picture images can be displayed by a flat-shaped display device using electron beams, a novel display device has been proposed in a Japanese Patent Application, Sho No. 56-20168, which was applied by the present applicants. The patent application mentioned above in such that the display plane on a screen of the device is divided into a plural number of segments in the vertical direction, and to each of those segments, one respective electron beam is provided, and in those respective segments a plural number of lines are displayed by means of deflecting those respective electron beams in the vertical direction, and each segment is further divided into a plural number of subsegments in the horizontal direction, and to each subsegment either one of the primary color phosphors of red (R), green (G) and blue (B) is allotted and they are made emit their colors successively by projecting the electron beam thereon, then by controlling the intensity or amount of projected electron beam on those phosphors of R, G and B in responding to the color video signals, as a whole, color television pictures are displayed. Such conventional system has a problem of poor horizontal resolution of displayed picture.

SUMMARY OF THE INVENTION

For image display apparatuses of such kinds as described above, the present invention is intended to provide an apparatus capable of displaying good detail in horizontal direction of the picture, without excessively complicating a circuit for obtaining signals which are necessary for controlling the amount of electron beams. This can be done by novel way of sampling the input color video signals corresponding to the respective phosphors subsegments with a time sequential relation of the colors, that is using sampling pulses of different phases for three color signals. Thereby, color resolution of the images on a display screen can be improved.

In accomplishing such the object, the present invention is characterized in that, as the control signals to be impressed to control electrodes which are for controlling the light-emission intensity of respective phosphor subsegments by controlling the amount of electron beams for the R, B and B phosphor subsegments of respective horizontal segments, such sampling signals are used as to time sequentially sample the demodulated chrominance signal, for example the primary color signals (primary color signals of R, G and B), within a time period of one picture element in the horizontal direction. Thereby, in comparison with the conventional case wherein the sampling is performed simultaneously (at one time), the video resolution for horizontally fine parts of picture is improved as if the sampling frequency were raised very high (about three times).

The image display apparatus in accordance with the present invention comprises:

a phosphor screen having a phosphor layer for emitting light at impingement by electron beam, the phosphor screen having a predetermined number of segment of formed by dividing in horizontal direction, and also having another predetermined number of subsegment formed by dividing in vertical direction, each subsegment having three primary color phosphor regions disposed in horizontal direction, an electron beam source for in-turn emitting a predetermined number of horizontal rows of electron beams, for producing one horizontal line of image on the phosphor screen, a vertical deflection means for vertical deflections of the electron beams of the horizontal rows in a manner that electron beams of a horizontal row impinging the phosphor screen at one of the vertical divided segment corresponding to one of the horizontal row is simultaneously driven vertically, thereby vertically moving one of the horizontal line in the vertically divided segment, a horizontal deflection means for horizontal deflections of the electron beams of the horizontal rows thereby sequentially to impinge selected color phosphors to display a selected color images sequentially in the segment, a control means for controlling intensities of the electron beams responding to control electric signals applied thereto, and a flat shaped vacuum enclosure containing the above-mentioned components therein, one end face thereof forming a screen face in which the color phosphor screen is provided, characterized by further comprising a control signal producing means for producing the control signals by decoding color picture signals thereby producing chrominance signals, and sampling the chrominance signals by a set of three sampling pulses for three primary colors of light, which three sampling pulses are issued in a time sequence in the color order corresponding to that of displaying, and within a time period corresponding to electron beam scanning for one horizontal picture element, and sampled chrominance signals are applied in the time sequence to the control means.

BRIEF EXPLANATION OF THE DRAWING

FIG. 3 is a circuit block diagram showing a fundamental electric construction which is for operating the cathode ray tube of FIG. 1 and is, a not yet disclosed preceding stage to reach the present invention.

FIG. 4 is waveform diagrams showing the relation between the sampling pulses in an embodiment of the present invention and those in the conventional method.

FIG. 6 is waveform diagrams showing the operations of composition of control signals by means of sampling in the present embodiment and in the conventional method.

DESCRIPTION OF THE PREFERRED EMBODIMENTS

Figure 1:
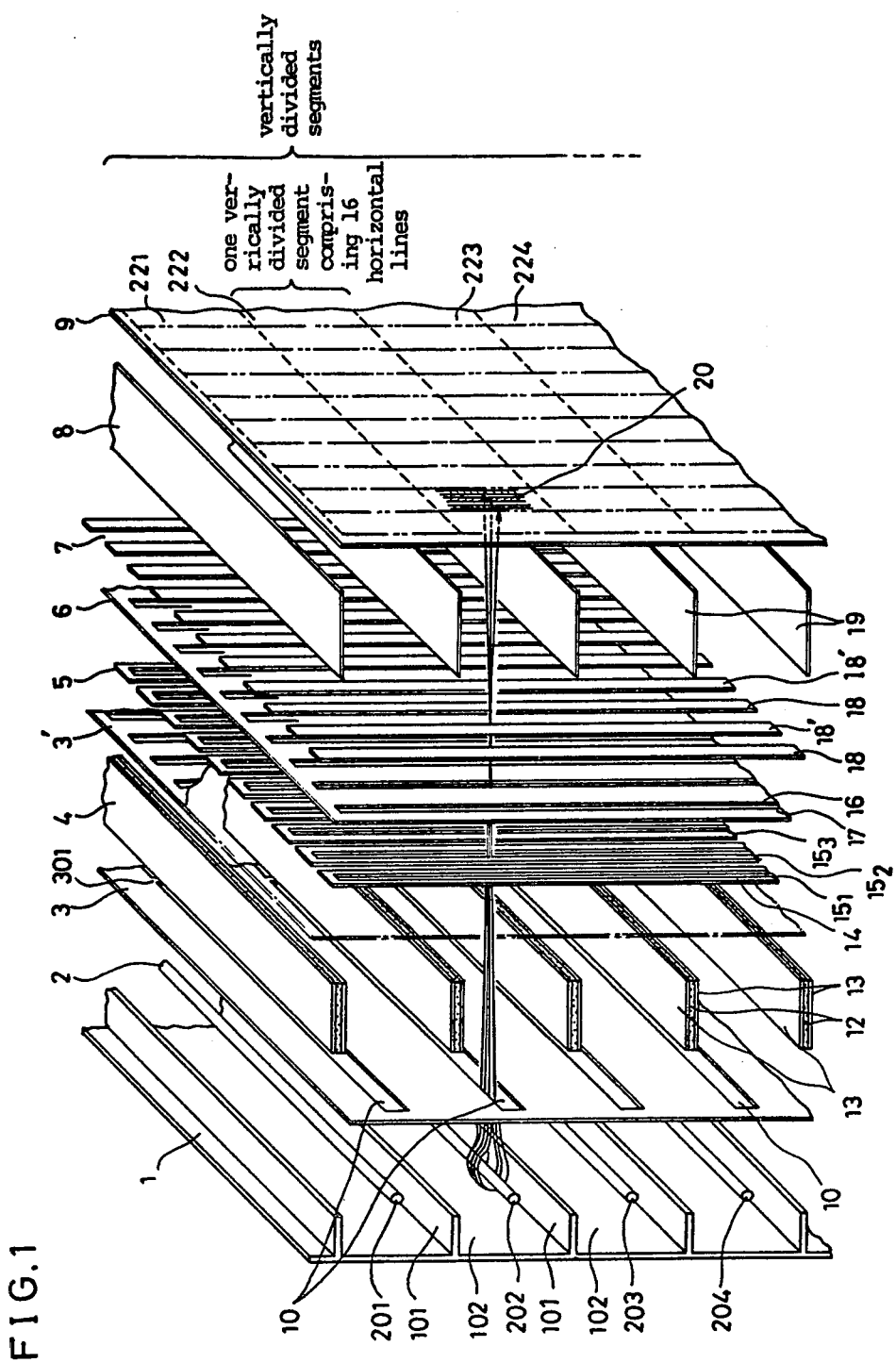
FIG. 1 is an exploded perspective view of a principal part, with its vacuum enclosure removed, of a cathode-ray tube for use in embodying the present invention, expanded of its size in the horizontal direction enlarged in comparision with the vertical direction for easier showing of minute constructions.

An example of the basic configuration of an image display apparatus of the present invention is shown in FIG. 1, wherein from the back part to front part the following components are provided in a flat box-shaped evacuated envelope not shown here, but preferable made of glass:

A back electrode 1 having horizontal isolation walls 101, 101, ... projecting perpendicularly therefrom forming isolated spaces 102, 102, ... therein, a row of a predetermined number (e.g. in this embodiment) of horizontal line cathode 201, 202, ... disposed substantially horizontally in the isolated spaces 102, 102, ..., a vertical beam-focussing electrode 3 having the predetermined number (e.g. 15 in this embodiment) of horizontal slits 10, a first vertical deflection means 4 comprising the predetermined number of pair of vertical deflection electrodes 13', 13 ..., held by insulator board 12. Each pair of vertical deflection electrodes comprises an upper electrode 13 and a lower electrode 13' both disposed substantially horizontal and defining a deflection space inbetween disposed before the corresponding horizontal slit 10, a second vertical beam-focussing electrode 3' substantially similar to the horizontal beam-focussing electrode 6, a predetermined large number (e.g. 320 for this embodiment) of beam control electrodes 5 consisting of vertical strip electrode $15_1$, $15_2$ ... $15_{320}$ each having beam-passing slits 14, 14 ... disposed with uniform pitch, a horizontal beam-focussing electrode 6 having the predetermined number (e.g. 320 for this embodiment) of vertical slits at positions in front of the slits 14,14, ... of the beam control electrodes 5, 5 ..., a horizontal deflection means 7 comprising the predetermined number (e.g. 320 for this example) of vertical strip electrodes 18, 18', 18, 18' ... defining the predetermined number (e.g. 320 for this example) of vertically oblong deflection gaps inbetween, a beam acceleration means 8 consisting of a set of horizontally disposed electrodes 19, 19 ..., and finally a phosphor screen 9, which is ordinarily provided on the inner wall of a front face of the enclosure.

The line cathodes 201, 202 ... form electron beam source 2, wherein horizontal line cathodes are disposed forming a vertical row, with substantially uniform gaps with each other. In this example, as abovementioned 15 line cathodes 201, 202 ... 215 are provided, but only four of them are shown. The line cathodes are made by coating a tungsten wire of, for example, 10–20 $\mu$m diameter with known electron emitting cathode oxide. All the line cathodes are heated by feeding current thereto, and selective in-turn taking out of horizontal sheet shaped electron beam from selected one of the line cathode is done by changing a potential of the in-turn selected line cathode to negative with respect to the potential of the focussing electrode 3.

The back electrode 1 serves to suppress emissions of electrons from other line cathodes than the selected one and also expel the electrons from the selected cathode to its front direction. The back electrode 1 may be formed by attaching conductive substance such as conductive paint on the inner wall of the back face of the flat type vacuum enclosure. A flat plane shaped cathode may be used in place of the row of the line electrode 201, 202 .... The first vertical beam-focussing electrode 3 have the slits 10 at the position to face the line cathodes 201, 202 ... and is impressed with a DC voltage, therefore horizontal sheet shaped electron beam from a selected line cathode is formed. The sheet shaped electron beam is then divided into a large number (e.g. 320 in this example) of narrow electron beams by passing through the second vertical beam-focussing electrode 3', the control electrode 5 and horizontal focussing elelectrode 6. In FIG. 1, only one such narrow electron beam is shown for simplicity. Each slit 10 may have supporting ribs in midway part of the length, or further may consists of a large number (e.g. 320) of openings with very narrow rib parts 301 inbetween.

The electrodes 13, 13' of the vertical deflection means 4 are disposed at levels of substantially the centers between vertically neighboring two horizontal slits 10, 10 of the vertical focussing electrode 3, and a lower electrode 13 and an upper electrode 13' are held on both faces (upper and lower faces) of an insulation board 12. A changing voltage (a vertical deflection signal) is impressed across the pair of upper electrode and lower electrode of each pair thereby forming changing electric field for vertical deflection. In this example, as has been elucidated, by impressing the 16-step changing voltage across the pair electrodes, each electron beam is deflected in a manner to have 16 levels. And the same matter takes place in each of 15 vertically divided segments 221, 222, 223 ... 235 on the phosphor screen. Accordingly, the phosphor screen 9 has 240 horizontal lines in total (16 lines×15 segments=240 lines).

The beam control electrodes 5 comprising 320 strip electrodes $15_1$, $15_2$ ... $15_{320}$ together with the horizontal beam-focussing electrode 6 divide the horizontal sheet shaped electron beam into 320 rod shaped electron beams, and each strip electrodes $15_1$, $15_2$ ... $15_{320}$ of the beam control electrodes 5 control intensities of the rod shaped electron beams responding to the information of the video signal. Therefore, the 320 strip electrodes control information of 320 picture elements on each horizontal line. The 320 beam control electrodes receive 320 control signals respectively and controls the 320 rod beams in such a manner as, at one time for red color irradiation, at one time for green color irradiation and at one time for blue color irradiation, in turn. In order to display color picture on the color phosphor screen with the control signals applied to the beam control electrodes, each picture element comprises three elementary color regions, namely red strip region, green strip region and blue strip region, which are disposed in horizontal direction.

In the example shown by FIG. 3, all the 320 beam control electrodes $15_1, 15_2 \ldots 15_{320}$ receive the beam control signals for displaying respective three primary colors, i.e., red and blue or green, at a same time. That is, at one moment, one horizontal line on the phosphor screen displays an image of red color parts and blue color parts of the line by impingements of red phosphor regions by odd number electron beams and impingements of blue phosphor regions by even number electron beams, at the next moment an image of green color part of the line, and at the next moment an image of red color parts and blue color part of the line by impingements of red color phosphors regions by even number electron beams and impingements of blue color phosphor regions by odd number electron beams. In this apparatus, the odd number electronic switches $35_1, 35_3, 35_5 \ldots 35_{15}$ switch to feed signal in the order of R, G and B, and the even number electronic switches $35_2, 35_4 \ldots 35_{14}$ switch in the order of B, G and R.

The horizontal beam-focussing electrode 6 is a conductor sheet with a plural number, e.g. 320, of slits facing the slits 14 of the control electrodes 5 and is impressed with a DC voltage and focusses the rod shaped electron beams in horizontal direction.

The horizontal deflection means 7 comprises strip electrodes 18, 18' ... which are disposed at the positions in front of center positions between neighboring slits 16, 16 of the horizontal beam-focussing electrode 6. Each of the strip electrodes pair 18, 18' is impressed with 3-level changing voltage or a horizontal deflection signal, and horizontally deflects rod shaped electron beams, thereby deflecting electron beams of odd number and even number to opposite directions, and making the rod shaped electron beams selectively impinge red phosphor regions, green phosphor regions or blue phosphor regions in turn. In another example where a pair of strip electrodes are provided for each slit and whole pair are impressed with same direction voltage, both even number electron beams and odd number electron beams in the same direction.

In the example, where a horizontal row of 320 rod shaped electron beams impinge 320 sets of three primary color regions, one horizontal deflection range corresponds to one horizontal picture element width.

The horizontally disposed electrodes of the beam-acceleration means 8 are disposed at the height level corresponding to those of the composite body of vertical deflection electrodes 13 and 13' and are impressed with a DC voltage.

The phosphor screen 9 may be provided with known metal back layer (not shown) formed on the side of cathodes and a positive DC voltage is impressed thereon. In practical example, the phosphor regions are formed vertically oblong strips of red color phosphor, green color phosphor and blue color phosphor. In FIG. 1, horizontal broken lines on the phosphor screen 9 show boundary lines between neighboring vertically divided segments to be impinged by electron beams of respective line cathodes. Vertical chain lines on the phosphor screen 9 shown boundary lines between horizontally neighboring sets of three primary color phosphor strips.

Figure 2:
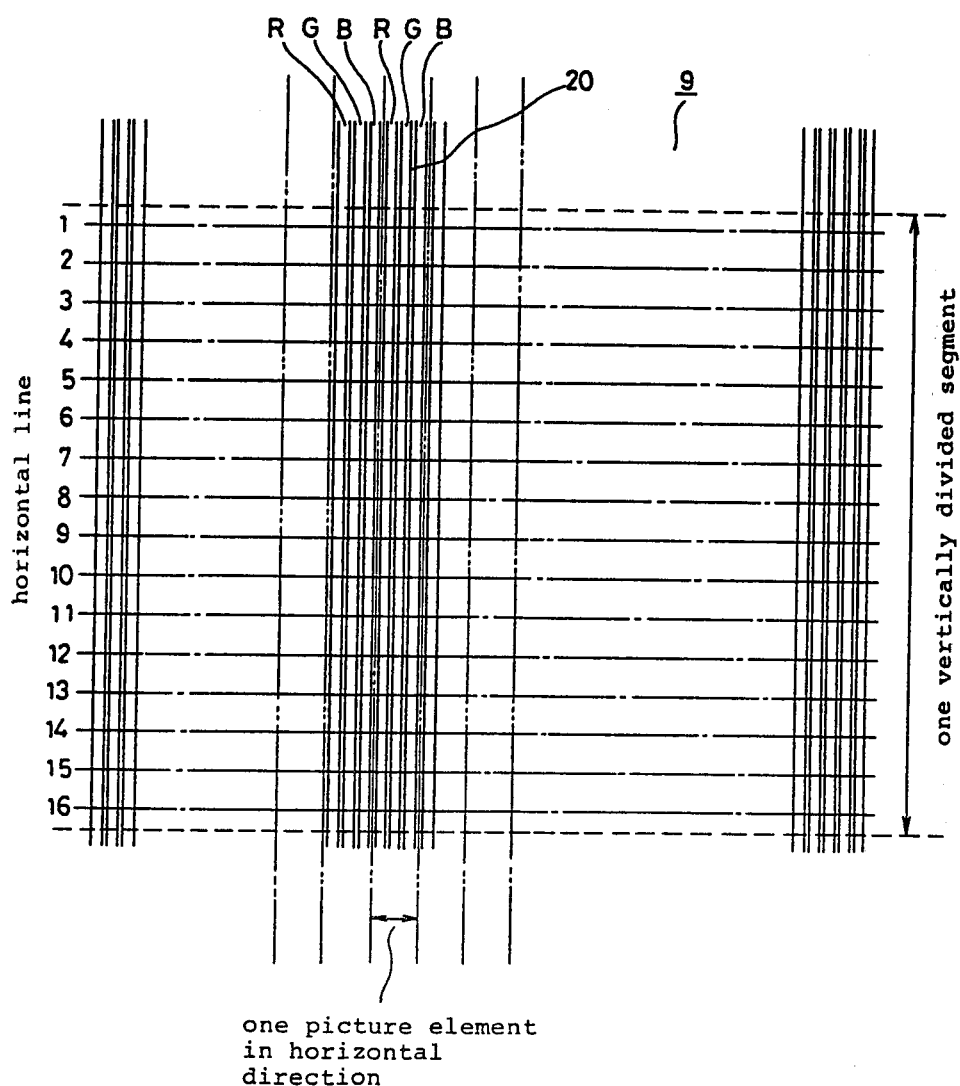
FIG. 2 is a shimatic expanded front view of a part of a phosphor screen of the cathode ray tube of FIG. 1.

A small segment 20, which is defined by two neighboring vertical chain lines and two neighboring horizontal broken lines, is shown enlarged, in schematic view of FIG. 2, wherein the small segment 20 has 16 horizontal lines in vertical row. In an actual example, one segment has the size of 16 mm high in vertical direction and 1 mm width in horizontal direction, and in FIG. 1 the sizes are shown enlarged in widthwise direction as has been mentioned.

Apart from the above-mentioned example where 320 sets of three primary color phosphor regions are formed widthwise of the phosphor screen for 320 rod shaped electron beams produced by 320 slits 14 of the beam-control electrode 5 and 320 slits 16 of the horizontal beam-focussing electrode 6, such a modification may be made that for the 320 sets of three primary color phosphor regions, 160 rod-shaped electron beams are provided, and in this case the horizontal deflection signal is 6-level changing voltage which deflects the rod-shaped electron beam to sweep for the horizontal range of the color phosphor regions of RGBRGB, and each of the beam-control electrodes 5 also receives the control signal for two picture elements in sequence.

FIG. 3 shows a circuit block diagram of a fundamental electric construction of the apparatus of FIG. 1. The explanation starts from the part to drive the cathode ray tube to form a raster on its phosphor screen.

A power supply 22 is for impressing necessary voltages on various electrodes of the flat cathode ray tube of FIG. 1. The following DC voltages are supplied to the electrodes:

$-V_1$ to back electrode 1,
  $V_3$ to vertical beam-focussing electrode 3,
  $V_3'$ to vertical beam-focussing electrode 3',
  $V_6$ to horizontal beam-focussing electrode 6,
  $V_8$ to acceleration electrode 8,
  $V_9$ to phosphor screen 9.

An input terminal 23 receives ordinary composite video signal and give it to a synchronizing signal separator 24 and to a chrominance demodulator 30. The synchronizing signal separator 24 separate and issues vertical synchronizing signal $V_s$ and horizontal synchronizing signal $H_s$. A vertical driving pulse generator 25 comprises a counter which count the horizontal synchronizing signal $H_s$ and is reset by the vertical synchronizing signal $V_s$, and issues 15 driving pulses p1, p2, p3 ... p15, each having duty time of 16H (1H is the time period for one horizontal scanning). The fifteen pulse p1 to p15 are issued during an effective vertical sweep period, which is the time length of one vertical sweep period exclusive of vertical fly-back time and is of 240H time length. The driving pulses are then given to the line cathode controller 26, where they are inversed of polarity to produce pulses p1', p2', p3' ... p15' falling down to 0 V at respective inversed peak period (of 16H length) and retaining 20 V for other period, and is fed to respective line cathodes 201, 202, 203 ... 215. The line cathodes are always heated by a small voltage DC current so as to be able to emit electrons at any time, and the electrons are taken out, when the pulse of a selected line cathode is at its peak (0 V), by means of positive electric field towards the vertical beam-focussing electrode 3 and subsequent other electrodes. For period other than the peak (0 V) of the pulses impressed on a line cathode, because of negative electric field formed by impression of +20 V thereon, the line cathodes do not emit electron beam. That is, one of the 15 line cathodes in turn emit electrons beams. Therefore, the line cathodes are activated in turn from the top one 201 to the bottom one 215 each for 16H time period. The emitted electrons are driven forward to the vertical beam-focussing electrodes 3, 3' and focussed to form a horizontal sheet-shaped electron beam.

A vertical deflection driver 27 comprises a counter for counting horizontal synchronizing signal $H_s$ and is reset by the output pulses p1, p2 . . . p15 of the vertical driving pulse generator 25 and an A/D converter for A/D converting the count output. And the vertical deflection driver 27 issues a pair of vertical deflection signals v, v', which are 16-step rising sawtooth wave and 16-step falling sawtooth wave, respectively, both having center voltage of $V_4$. These vertical deflection signals v and v' are impressed on the upper vertical deflection electrodes 13 and the lower vertical deflection electrodes, respectively. Accordingly, the sheet shaped electron beams are vertically stepwisely deflected in 16 steps and repeat the same. And therefore, a horizontal line displayed on the phosphor screen stepwisely falls from top position to bottom position in 16 steps in one vertically divided segment 221, 222 . . . or 235 of FIG. 1.

Since the activation of the line cathodes is stepwisely shifted one by one downward every 16H time period, when the horizontal line on the phosphor screen comes down and arrives at the bottom of the first vertically divided segment 221, the next moving of the horizontal line on the phosphor screen starts from the top position of the second vertically divided segment 222, and the similar downward shifting of the horizontal line proceeds until the horizontal line arrives at the bottom of the 15th (lowest) vertically divided segment 235, and the horizontal line goes back to the top of the first segment 221. That is, the vertical deflection of the horizontal line continuously proceeds from the top (No. 1 horizontal line) to the bottom (No. 240, i.e., (15×16)th) of the phosphor screen 9, thereby forming a raster of 240 horizontal lines.

The sheet-shaped electron beam is then divided into 320 rod-shaped electron beams having substantially round sections when passing through the vertically oblong slits 14, 14 . . . of the beam-control electrode 15$_1$, 15$_2$ . . . and vertically oblong slits 16, 16 . . . of the horizontal beam-focussing electrode 6. The rod-shaped electron beams are controlled of their currents by means of voltage impressed on respective strip electrodes of the beam-control means 5, and further deflected by horizontal deflection means 7 so as to have one of three positions corresponding to R, G and B regions of the phosphor screen 9 by means of the horizontal deflection signals given by the horizontal deflection driver 29.

A horizontal driving pulse generator 28 comprises three stages of sequentially connected monostable multivibrators, the first stages of which is triggered by horizontal synchronizing signal $H_s$. And the horizontal driving pulse generator issues three pulses r, g and b of the same pulse widths. For one example, an effective horizontal scanning period of 50 $\mu$ sec. is divided into 3 periods for the pulses r, g and b, accordingly, the pulses, r, g and b have 16.7 $\mu$ sec. pulse width each. The horizontal driving pulses r, g and b are given to the horizontal deflection driver 29, which is switched by the horizontal driving pulses r, g and b and issues a pair of horizontal deflection signals h and h'. These horizontal deflection signals h and h' are three step rising signal and three step falling signal, respectively, and, both have the same center voltage $V_7$. These horizontal deflection signals h and h' are given to the horizontal deflection electrodes 18, 18, 18 . . . and 18', 18', 18'. . . dispose alternately in the horizontal deflection means 7. As a result, 320 rod-shaped electron beams are deflected at the same time to R, G or B regions on a same horizontal line of the phosphor screen.

It should be noted that in the construction shown in and elucidate referring to FIG. 1, the number of strip electrodes 18, 18'. . . of the horizontal electrodes are 320 for the 320 rod-shaped electron beams, and the strip electrodes 18, 18'. . . are alternately connected to the output terminals h and h' of the horizontal deflection driver. Accordingly, the electric fields of horizontal deflection gaps defined by neighboring two strip electrodes 18 and 18' are not of the same direction. Namely, the directions of electric field of the horizontal deflection gaps are alternatingly opposite each other for neighboring horizontal deflection gaps. The effect of this alternatingly opposite electric field is compensated as will be elucidated later.

Thus, the horizontal line on the phosphor screen at one time displays red image at the same time, at the next time green image at the same time and at the next time blue image at the same time, and at the next time the line proceed to the next lower line whereon the same is repeated.

The beam intensity control is made as follows:

The input composite video signal received at the input terminal 23 is given to the chrominance demodulator 30 where color differential signals R-Y and B-Y are demodulated and G-Y is also produced by known matrix circuit therein, and by processing these color differential signals with a luminance signal Y, primary color signals R, G and B are produced. The primary color signals R, G and B are given to 320 sets of sample-hold means 31$_1$, 31$_2$ . . . 31$_{320}$, each comprising three elementary sample-hold circuits for R, G and B color signals. Though the color differential signals R-Y and B-Y have a low frequency components only, the processed primary color signals R, G and B has high frequency components. The output signals of the 960 elementary sample-hold circuits are given to 320 sets of memory means 32$_1$, 32$_2$ . . . 32$_{320}$, each comprising three memories for R, G and B color signals.

On the other hand a sampling clock generator 33 comprises PLL (phase locked loop) circuit, and issues sampling clock pulses of 6.4 MHz, which is controlled to have a predetermined phase difference against the horizontal synchronizing signal $H_s$. The sampling clock pulses are given to the sampling pulse generator 34, wherein by means of, for example, a shift register of 320 stages, 320 sampling pulses S$_1$, S$_2$ . . . S$_{320}$, each having phase difference by 50 $\mu$sec/320 time inbetween, are produced and given to the sample hold circuits 31$_1$, 31$_2$ . . . 31$_{320}$, respectively. After the last sampling pulse S$_{320}$, a transferring pulse S$_t$ is issued from the sampling pulse generator 34 to the memories 32$_1$, 32$_2$ . . . 32$_{320}$. The sampling pulses S$_1$, S$_2$ . . . S$_{320}$ correspond to 320 picture elements in the horizontal direction on the phosphor screen 9, and their timings are controlled so as to have a constant relation with respect to the horizontal synchronizing signal $H_s$. By impressing the 320 sets of sampling pulses to respective 320 sets of sample-hold circuits, the sample-hold circuits $31_1$, $31_2$ ... $31_{320}$ sample and hold R, G and B information of video signals therein. After finishing of the sample-hold for one horizontal line, upon receipt of the transfer signal $S_t$ by the memories, the sample-held informations are transferred at one time to the memories $32_1$, $32_2$ ... $32_{320}$, and retained there for the next one horizontal scanning period (H=63.5 $\mu$ sec).

The R, G and B information of the video signal for the one horizontal line stored in the memories $32_1$, $32_2$ ... $32_{320}$ are led to 320 electronic switches $35_1$, $35_2$ ... $35_{320}$, which are electronics switches comprising analog gate circuits for selectively leading the stored signals of a color R, G or B to the respective strip electrodes $15_1$, $15_2$ ... $15_{320}$ of the beam control means 5. The switching circuits $35_1$, $35_2$ ... $35_{320}$ are simultaneously switched, being controlled by switching pulses given from a switching pulse generator 36, which is controlled by the output pulses r, g and b of the horizontal driving pulse generator 28. The electronic switches $35_1$, $35_2$ ... $35_{320}$ switch every 16.7 $\mu$sec (=50 $\mu$sec/3) for selectively leading the video signal information of R, G and B color in turn each for 16.7 $\mu$ sec.

In the switching, the switching circuits of the odd number orders are switched in the order of R→G→B while the switching circuits of the even number orders are switched in the order of B→G→R, so that the effect of the alternatingly opposite directed electric fields produced by the horizontal deflection means 7 is compensated.

Hereupon it should be noted that timing (phases) of the switchings of the electronic switches $35_1$, $35_2$ ... $35_{320}$ and the horizontal deflection driver 29 should be completely synchronized with each other, in order to avoide poor color impurity caused by undesirable mixing of a color signal with other color signals.

As a result of the operation as has been elucidated, the phosphor screen displays red color image of one horizontal line at one time, followed by green color image of the horizontal line at one time and further followed by blue color image of the horizontal line at one time, and then the same displaying is made proceeding to the next (lower) line, and thus displaying of one field having 240 horizontal lines is completed. And the displayings of the fields are repeated and television picture is obtainable on the phosphor screen 9.

In case the number of picture elements on one horizontal line is selected twice or three times of the number of rod shape electron-beams each individually controlled by independent beam control electrodes $15_1$, $15_2$, ..., the number of the above-mentioned sample-hold circuits must be increased twice or three times, to the number of the picture elements on the line, and relevantly, the numbers of the memories should also be increased to the same number. And each electronic switch should selectively connect the outputs of the increased number of memories time sharingly to the corresponding beam-control electrodes.

The primary colors of the phosphor regions are not necessarily limited to the combination of the R, G and B, but any other combination as the primary color of phosphors may be usable.

In the above-mentioned description, the words "horizontal" and "vertical" are used to imply that "horizontal" is the direction that the lines are displayed on the phosphor screen, and "vertical" is the direction that the displayed line is shifted to the next line to form a raster, and accordingly these words are not bound to the absolute spatial relation of the screen.

As can be understood from the example described above, the same sampling pulses are impressed at one time for all of the three primary color selections of R, G and B of a sample hold circuits (for example $31_i$ or $31_j$ or ...). The point of time and time width are made to correspond to each picture element (for example j-th picture element) in the horizontal direction. The timing relation of those sampling pulses is shown in FIG. 4, wherein dot line pulses show the conventional sampling pulses simultaneously applied for all primary colors R, G and B. The pulsewidth of the sampling pulses $S_1$, $S_2$, ... or $S_{320}$ is taken to be a time corresponding to scan for one picture element in the horizontal direction. In the above conventional example, since the working of horizontal scanning time period is about 50 $\mu$sec and the number of picture elements in the horizontal direction is 320, each sampling pulsewidth becomes about 0.516 $\mu$sec i.e. the fundamental frequency is about 6.4 $MH_z$. With this sampling frequency of about 6.4 MHz, a satisfactory reproduction of the three primary colors, R, G and B with good resolution is impossible, since the primary color signals has components ranging up to 3.5 to 4 MHz, and samplings of such signals necessitate sampling frequency of 7 to 8 MHz. If doing this, this causes an increase in the number of hold circuit elements (that is, memory elements) by about 20 to 30%, and brings about an undesirable cost increase.

In this connection, the present invention is to provide a new sampling method in which the sampling is performed as if the sampling frequency is increased without bringing about an increase in the number of hold circuit elements, offering a new sampling method enabling a sufficient primary color reproduction. In the example described above, those sampling pulses impressed to the sampling circuits $31_1$, $31_2$ ... $31_{320}$ respective picture elements were impresed thereto at one time for all of R, G and B, but in the present invention, as shown in FIG. 4, pulses 1R, 1G, 1B, ... 320R, 320G, 320B where pulsewidths are about one third of those of the sampling pulses $S_1$, $S_2$, ... $S_{320}$ (shown by the broken lines) of the conventional method are used as the sampling pulses, and they are generated successively in time (time sequentially) for respective picture elements. In this case, sampling pulses corresponding to respective primary color signals R, G and B (1R, 2R, ... 320R; 1G, 2G, ..., 320G; 1B, 2B, ..., 320B) have the same sampling frequencies as those of the conventional method, but their pulsewidths are about one third of those of the conventional method, and accordingly, it can be understood that the sampling frequency acts equivalently three times higher than that of the read frequency for respective R, G and B components of the video picture signals.

Figure 5A:
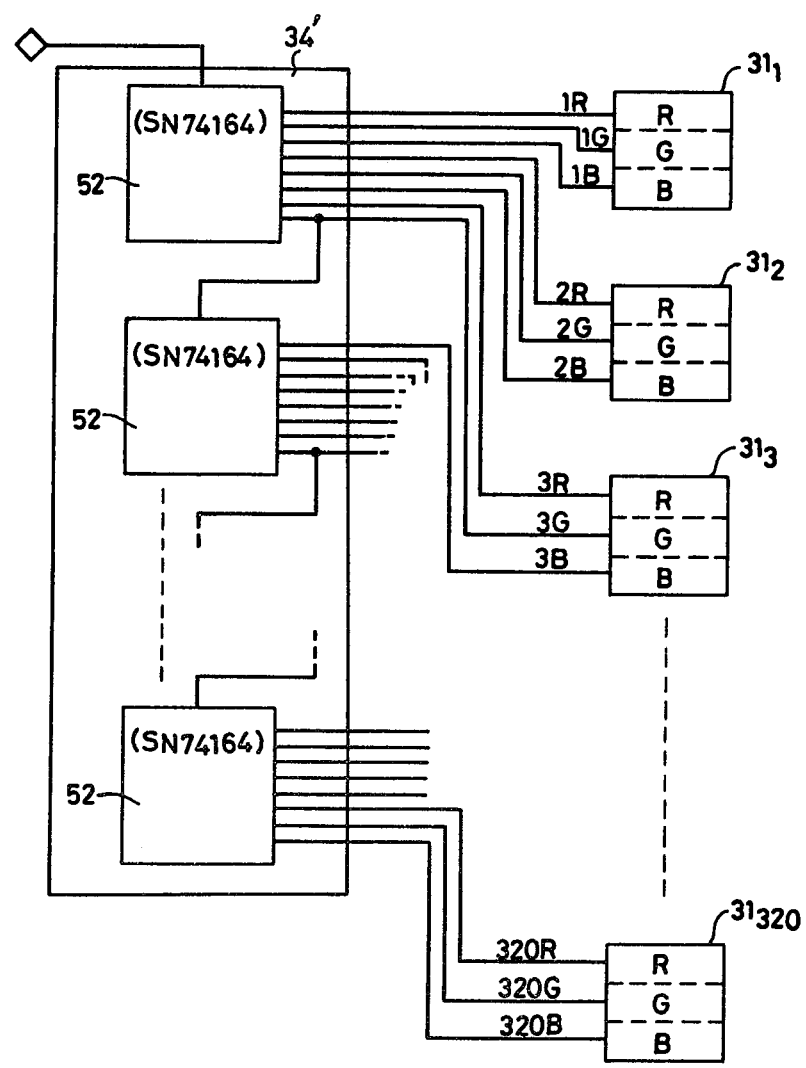
FIG. 5a is a circuit diagram of a sampling pulse impressing circuit in a picture image display apparatus of an embodiment of the present invention.
Figure 5B:
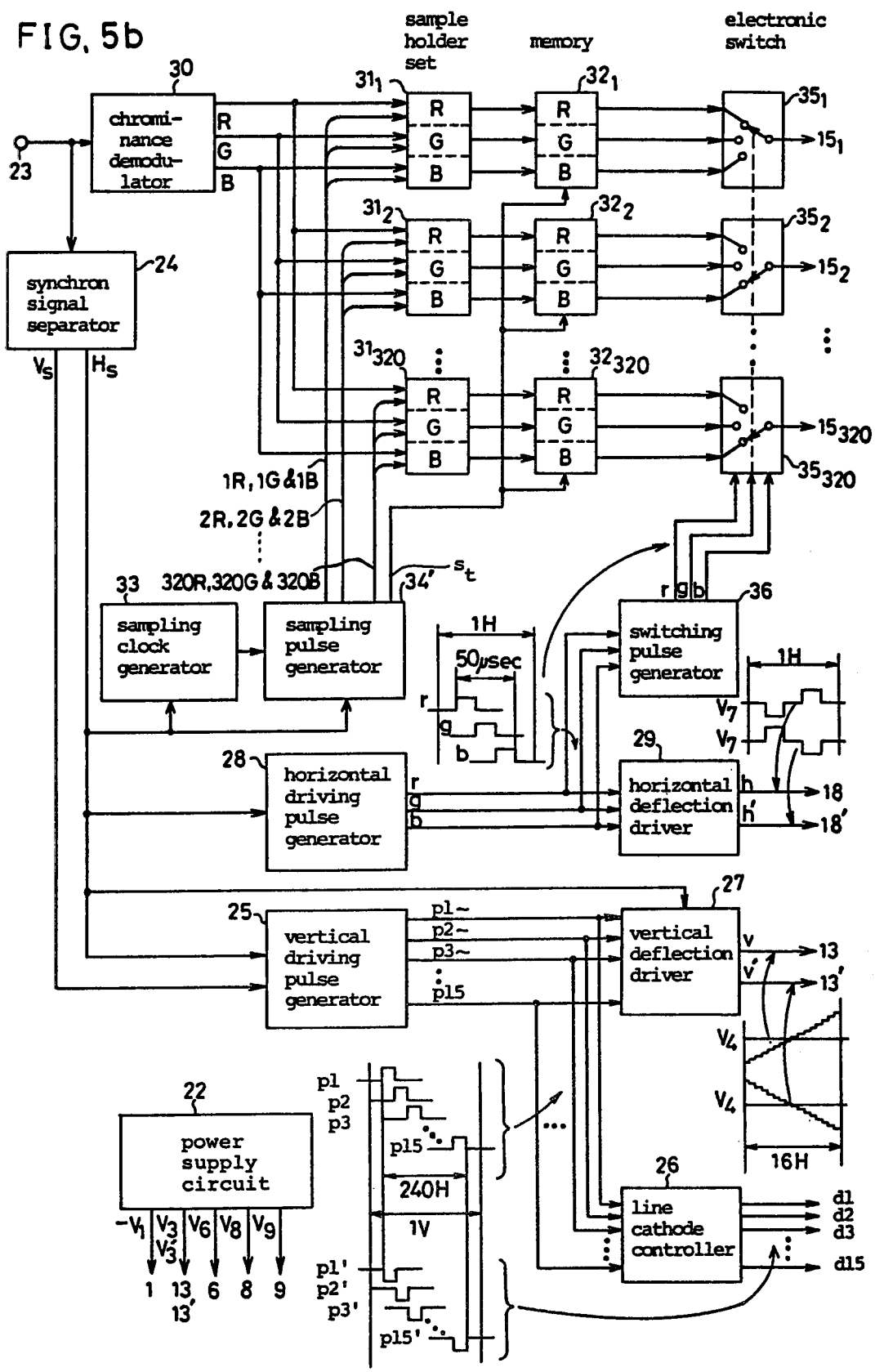
FIG. 5b is a circuit diagram showing a fundamental electric construction embodying the present invention.

A practical example of the circuit working as described above of the present apparatus is shown in FIG. 5a which is an example of the part of sampling pulse generator 34' and sample holder set, and FIG. 5b which is a circuit diagram of the whole circuit of the apparatus. To an input terminal 51, input trigger pulses corresponding to the horizontal synchronization signal are impressed. A large number of 8-bit shift registers 52 (for example, SN74164) connected in cascade produces sampling pulses, 1R, 1G, 1B, 2R, 2G, 2B . . . , 320R, 320G and 320B form the sampling pulse generator 34', and the sampling pulses are impressed therefrom respectively to the sample-hold circuits $31_1$, $31_2$ . . . , $31_{320}$.

With the use of the circuit described above, the increase of the number of the hold-circuit elements inevitably rising up when the sampling frequency is to be increased can be prevented by means of sampling the primary color signals of R, G, and B successively by dividing one sampling period of the conventional method into three parts. Still further, concerning the video signals contained in the primary color signals, the sampling frequency acts as if it becomes three times higher, then the resolution in the picture images on the screen is estimated to be extending up to three times.

In FIG. 6, signals which are impressed to the control electrodes in the conventional method and those of the present embodiment are compared to each other. Y represents the luminance signal and R, G, and B represent respectively the primary color signals of red, green, and blue (for examle, R represents a signal that is the Y signal added by the color component of red). P represents a row of the R, G, and B phosphor sub-segments on the screen, X represents the control signal of the conventional method, and Z represents the control signal of the present invention. Comparing X with Z, as can be seen from a part of the signal where the color component is absent, the Z signal represents components of the original Y signal far better than X does, thereby it is understood that the present invention improves the resolution in the video picture images.

As has been descrived, in accordance with the present invention, it becomes possible to obtain an excellent image display apparatus in which the resolution in the horizontal direction is improved remarkably with a simple configuration.

We claim:
1. An image display apparaus comprising:
   a phosphor screen having a phosphor layer for emitting light at impingement by electron beam, said phosphor screen having a predetermined number of segments formed by dividing in vertical direction, and also having another predetermined number of subsegment formed by dividing in horizontal direction, each subsegment having three primary color phosphor regions disposed in horizontal direction,
   an electron beam source for in-turn emitting a predetermined number of horizontal rows of electron beams, for producing one horizontal line of image on said phosphor screen,
   a vertical deflection means for vertical deflections of said electron beams of said horizontal rows in a manner that electron beams of a horizontal row impinging said phosphor screen at one of said vertically divided segment corresponding to one of said horizontal row is simultaneously driven vertically, thereby vertically moving one of said horizontal line in said vertically divided segment,
   a horizontal deflection means for horizontal deflections of said electron beams of said horizontal rows thereby sequentially to impinge selected color phosphors to display a selected color images sequentially in said segment,
   a control means for controlling intensities of said electron beams responding to control electric signals applied thereto, and
   a flat shaped vacuum enclosure containing the above-mentioned components therein, one end face thereof forming a screen face in which the color phosphor screen is provided,
   characterized by further comprising
   a control signal producing means for producing said control signals by decoding color picture signals thereby producing primary color signals, and sampling said primary color signal by a set of three sampling pulses for three primary colors of light, which three sampling pulses are issued in a time sequence in the color order corresponding to that of displaying, and within a time period corresponding to electron beam scanning for one horizontal picture element, and sampled chrominance signals are applied in said time sequence to said control means.

2. An image display apparatus in accordance with claim 1, wherein
   each said horizontally divided subsegment has a set of phosphor regions of red, green and blue which are said primary colors, and
   said control signal producing means impresses control signals of red, green and blue signals in the same order as that of light emission of these colors.

3. An image display apparatus in accordance with claim 2, wherein
   said red, green and blue control signals are produced by chrominance decoding from composite color television signal.

* * * * *